(12) United States Patent
Seo

(10) Patent No.: US 7,463,128 B2
(45) Date of Patent: Dec. 9, 2008

(54) LOCK MECHANISM FOR STAGE APPARATUS

(75) Inventor: Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 83 days.

(21) Appl. No.: 11/688,967

(22) Filed: Mar. 21, 2007

(65) Prior Publication Data
US 2007/0222544 A1 Sep. 27, 2007

(30) Foreign Application Priority Data
Mar. 23, 2006 (JP) .............................. 2006-080119

(51) Int. Cl.
*H01F 7/20* (2006.01)
*G03B 17/00* (2006.01)
(52) U.S. Cl. ..................... 335/285; 335/296; 396/55; 348/E5.046
(58) Field of Classification Search ............... 335/285, 335/296; 396/55; 348/E5.046
See application file for complete search history.

(56) References Cited

U.S. PATENT DOCUMENTS

| 5,266,988 | A | * | 11/1993 | Washisu ....................... 396/55 |
| 6,718,131 | B2 | * | 4/2004 | Okazaki et al. ................ 396/55 |
| 2007/0093108 | A1 | | 4/2007 | Nemots et al. |
| 2007/0096477 | A1 | | 5/2007 | Hirunuma et al. |

FOREIGN PATENT DOCUMENTS

| JP | 10-39352 | 2/1998 |
| JP | 11-271833 | 10/1999 |
| JP | 3431020 | 5/2003 |
| JP | 2004-163648 | 6/2004 |

OTHER PUBLICATIONS

P 3431020 B2, together with an English language Abstract and an English language computer-generated translation of the corresponding JP 2002-290816 A.
English language Abstract JP 10-39352.
English language Abstract JP 2004-163648.
English language Abstract JP 11-271833.

* cited by examiner

*Primary Examiner*—Ramon M Barrera
(74) *Attorney, Agent, or Firm*—Greenblum & Bernstein, P.L.C.

(57) ABSTRACT

A lock mechanism for a stage apparatus, includes a stationary support board; a movable stage; a leaf spring supported by the stationary support board; a press portion and a pressed portion provided on the leaf spring and the movable stage, respectively, a frictional contacting member being fixed to at least one of opposed surfaces of the press portion and the pressed portion; an electromagnet for resiliently deforming the leaf spring in a lock releasing direction to disengage the frictional contacting member from the one of opposed surfaces of the press portion and the pressed portion; and a permanent magnet, fixed to the stationary support board, which magnetically attracts the leaf spring to hold the frictional contacting member and the one of opposed surfaces of the press portion and the pressed portion in a disengaged state when the leaf spring is resiliently deformed by the electromagnet.

15 Claims, 8 Drawing Sheets

Rear ←→ Front

Z

LOCK MECHANISM FOR STAGE APPARATUS

BACKGROUND OF THE INVENTION

1. Field of the Invention

The present invention relates to a lock mechanism for a stage apparatus which locks a movable stage when the movable stage, which is freely movable in a specific plane, is in a non-operational state.

2. Description of the Prior Art

Examples of the aforementioned conventional lock mechanism for a movable stage are disclosed in, e.g., Japanese Patent No. 3431020 and Japanese unexamined Patent Publication Nos. H10-39352, 2004-163649 and H11-271833.

The lock mechanisms disclosed in these documents are each applied to a hand-shake correction apparatus (image-shake correction apparatus/image-shake reduction apparatus) of a camera. Each of theses lock mechanisms is provided with a lock recess which is formed on a removable stage that supports either a correction lens or an image pickup device, and is further provided with a lock pin capable of being engaged and disengaged in and from the lock recess. When no handshake correction is performed, the movable stage is locked by making the lock pin engaged in the lock recess.

However, in the lock mechanism such as disclosed in the above-mentioned documents, a clearance is inevitably created between the lock pin and the lock recess, and accordingly, the movable stage cannot be locked firmly so as to have no play. Namely, even if the movable state is locked by the engagement of the lock pin in the lock recess, play corresponding to the amount of clearance between the lock pin and the lock recess inevitably occurs.

Additionally, in the lock mechanisms disclosed in the above-mentioned documents, the lock pin and a member for moving the lock pin are large in size in a direction orthogonal to the movable stage, which increases the lengths of the lock mechanism and the hand-shake correction apparatus in the optical axis direction.

In addition, there has been a problem in that the movable stage must be moved to a position where the lock pin and the lock recess face each other when the lock pin is brought into the lock recess to be engaged therewith.

SUMMARY OF THE INVENTION

The present invention provides a lock mechanism for a stage apparatus which can fully remove play between the movable stage and a stationary support portion therefor when the movable stage is locked by the lock mechanism, which can be constructed so as to reduce the size of the lock mechanism in a direction orthogonal to the movable stage, and which does not have to be moved to a specific position even when the movable stage is locked by the lock mechanism.

According to an aspect of the present invention, a lock mechanism for a stage apparatus is provided, including a stationary support board; a movable stage movable relative to the stationary support board in a plane parallel to the stationary support board; a leaf spring made of a magnetic material which is partly supported by the stationary support board to be substantially parallel to the stationary support board; a press portion and a pressed portion provided on the leaf spring and the movable stage, respectively, the press portion being pressed against the pressed portion in a free state of the leaf spring to lock the movable stage, a frictional contacting member being fixed to at least one of opposed surfaces of the press portion and the pressed portion to enhance friction between the press portion and the pressed portion; an electromagnet for resiliently deforming the leaf spring in a lock releasing direction to disengage the frictional contacting member from the one of opposed surfaces of the press portion and the pressed portion by exerting magnetic force on the leaf spring upon an electric current being passed through the electromagnet in a specific direction; and a permanent magnet, fixed to the stationary support board, which magnetically attracts the leaf spring to hold the frictional contacting member and the one of opposed surfaces of the press portion and the pressed portion in a disengaged state when the leaf spring is resiliently deformed in the lock releasing direction by the electromagnet.

It is desirable for the electromagnet to generate a magnetic force which counteracts the effect of a magnetic attracting force between the leaf spring and the electromagnet to disengage the leaf spring from the permanent magnet when an electric current is passed through the electromagnet in a direction opposite to the specific direction in a state where the leaf spring is magnetically attracted by the permanent magnet to stick thereto.

It is desirable for the frictional contacting member to include at least two frictional contacting members arranged at different positions as viewed in a direction orthogonal to the movable stage.

It is desirable for the lock mechanism for the stage apparatus to include a moving range limiting device, provided between the movable stage and the stationary support board, which limits the range of movement of the movable stage relative to the stationary support board to a predetermined range of movement in which the press portion and the pressed portion remain opposed to each other regardless of where the movable stage moves within the predetermined range of movement.

It is desirable for the moving range limiting device to include a moving range limiting pin which projects from one of the movable stage and the stationary support board; and one of a moving range limiting hole and a moving range limiting recess which is formed in the other of the movable stage and the stationary support board and in which the moving range limiting pin is inserted.

It is desirable for the movable stage to be rotatable relative to the stationary support board.

It is desirable for the frictional contacting member to be made of one of rubber and polyvinyl chloride.

It is desirable for the stationary support board to be made of a magnetic material, wherein the electromagnet includes a core rod made of a magnetic material which connects the leaf spring to the stationary support board; and a coil which is positioned around the core rod and through which an electric current is passed, and wherein a magnetic circuit is formed between the stationary support board and the leaf spring via the core rod and the permanent magnet to generate a magnetic attracting force between the leaf spring and the permanent magnet.

It is desirable for the lock mechanism for the stage apparatus to include a magnetic board positioned on the opposite side of the movable stage with respect to the stationary support board so that the movable stage is positioned between the magnetic board and the stationary support board; a magnet, fixed to one of the stationary support board and the magnetic board, for forming a magnetic drive circuit between the stationary support board and the magnetic board in order to drive the movable stage; and a drive coil, fixed to the movable stage, for producing a driving force which moves the movable stage relative to the stationary support board by receiving magnetic force generated by the magnetic drive circuit in a state where an electric current is passed through the drive coil.

It is desirable for the stationary support board to include two stationary support boards arranged parallel to the movable stage with the movable stage positioned between the two stationary support boards.

It is desirable for the leaf spring and the permanent magnet to be fixed to one of the two stationary support boards.

It is desirable for the permanent magnet to include two permanent magnets positioned on opposite sides of the electromagnet to face the leaf spring in a vicinity of opposite ends of the leaf spring, respectively, in a direction orthogonal to the movable stage.

It is desirable for the lock mechanism to be configured for a camera-shake correction apparatus incorporated in a digital camera.

It is desirable for the movable stage to be provided with an image pickup device mounted thereon.

In an embodiment, a lock mechanism for a stage apparatus is provided, including two stationary support boards; a movable stage positioned between the two stationary support boards to be movable relative to the two stationary support boards in a plane parallel to the two stationary support boards; a conductive leaf spring which is positioned between one of the two stationary support boards and the movable stage and fixed at a central portion of the conductive leaf spring to the one of the two stationary support boards via a conductive connecting member; two press portions fixed to the leaf spring on opposite sides of the conductive connecting member, respectively, and two pressed portions fixed to the movable stage to face the two press portions, respectively, the two press portions being pressed against the two pressed portions when the movable stage is locked, and a frictional contacting member being fixed to at least one of opposed surfaces of each the two press portion and associated one of the two pressed portions; a coil positioned around the conductive connecting member, the conductive connecting member and the coil serving as an electromagnet which resiliently deforms the leaf spring in a lock releasing direction to disengage the frictional contacting member from the one of opposed surfaces by exerting magnetic force on the leaf spring upon an electric current being passed through the coil in a specific direction; and at least one permanent magnet, fixed to the stationary support board, which magnetically attracts the leaf spring to hold the frictional contacting member and the one of opposed surfaces in a disengaged state when the leaf spring is resiliently deformed in the lock releasing direction by the electromagnet.

According to the lock mechanism according to the present invention, a firmly locked state of the movable stage can be achieved since the movable stage is prevented from moving even slightly upon the frictional contacting member, which is fixed to at least one of opposed surfaces of the press portion and the pressed portion, and the other of the opposed surfaces (or frictional contacting member) coming into surface contact with each other by the resiliency of the leaf spring.

Moreover, the existence of the leaf spring does not cause a substantial increase in the size of the lock mechanism in a direction orthogonal to the movable stage since the leaf spring, which serves as an element for biasing the press portion toward the pressed portion, is a plate member elongated in a direction substantially parallel to the stationary support board.

Furthermore, if the lock mechanism is provided between the movable stage and the stationary support board with the moving range limiting device, the press portion and the pressed portion remain opposed to each other no matter where the movable stage moves within a predetermined range of movement, the press portion and the pressed portion can be securely brought into contact with each other with no need to move the movable stage to a specific position (e.g., initial position) even when the movable stage is locked by the lock mechanism.

The present disclosure relates to subject matter contained in Japanese Patent Application No. 2006-80119 (filed on Mar. 23, 2006), which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

In the following description, as shown by the double-headed arrows in FIGS. 1 and 2, the leftward/rightward direction, the upward/downward direction, and the forward/rearward direction of a camera-shake correction apparatus 30 incorporated in a digital camera 20 are defined as the X-direction, the Y-direction and the Z-direction, respectively.

Firstly the camera-shake correction apparatus (hand-shake correction apparatus/stage apparatus) 30, which has a lock mechanism 100 therein according to the present invention, will be described hereinafter.

Figure 1:
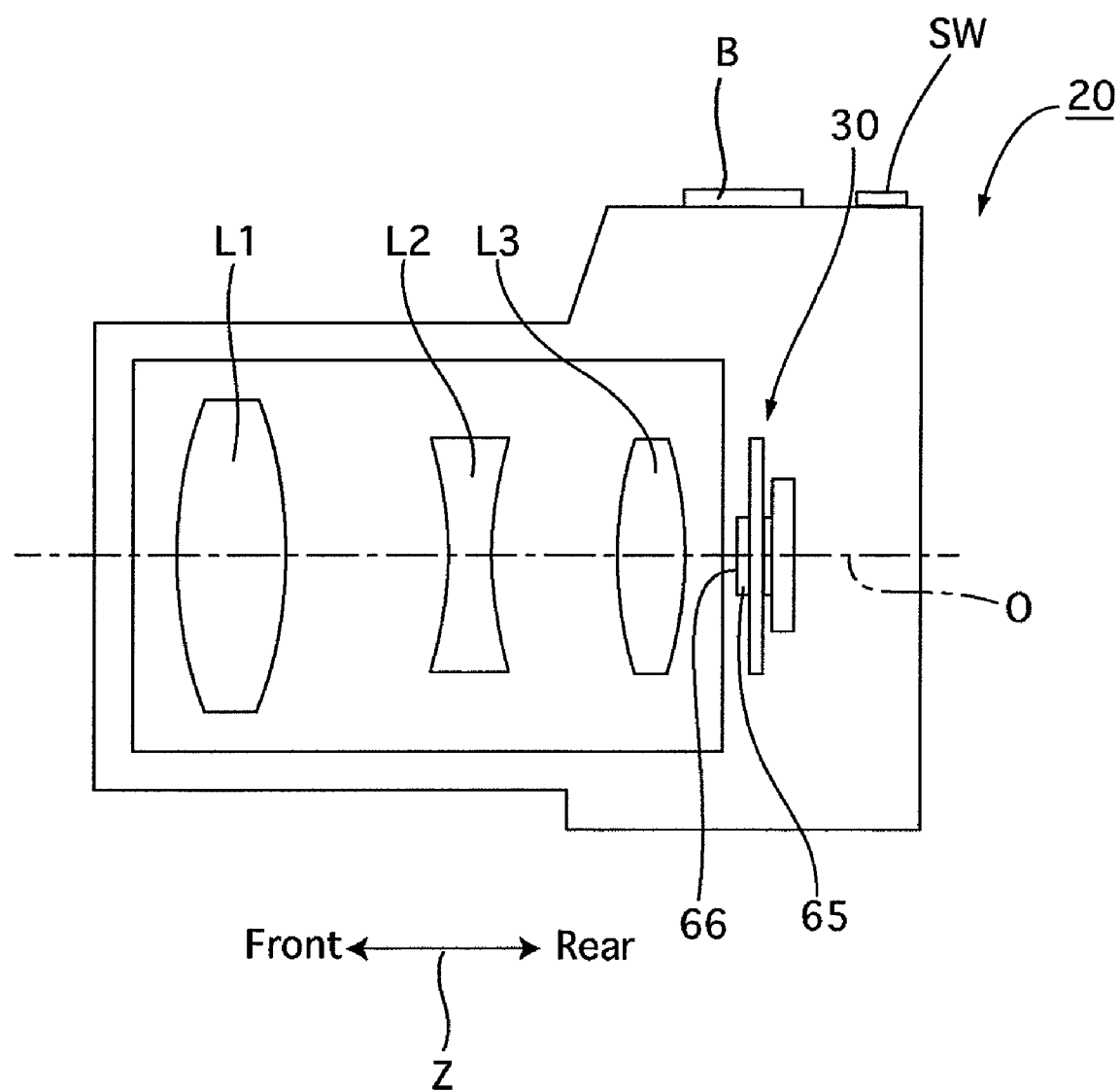
FIG. 1 is a longitudinal sectional view of a digital camera which incorporates an embodiment of a camera-shake correction apparatus according to the present invention.
Figure 2:
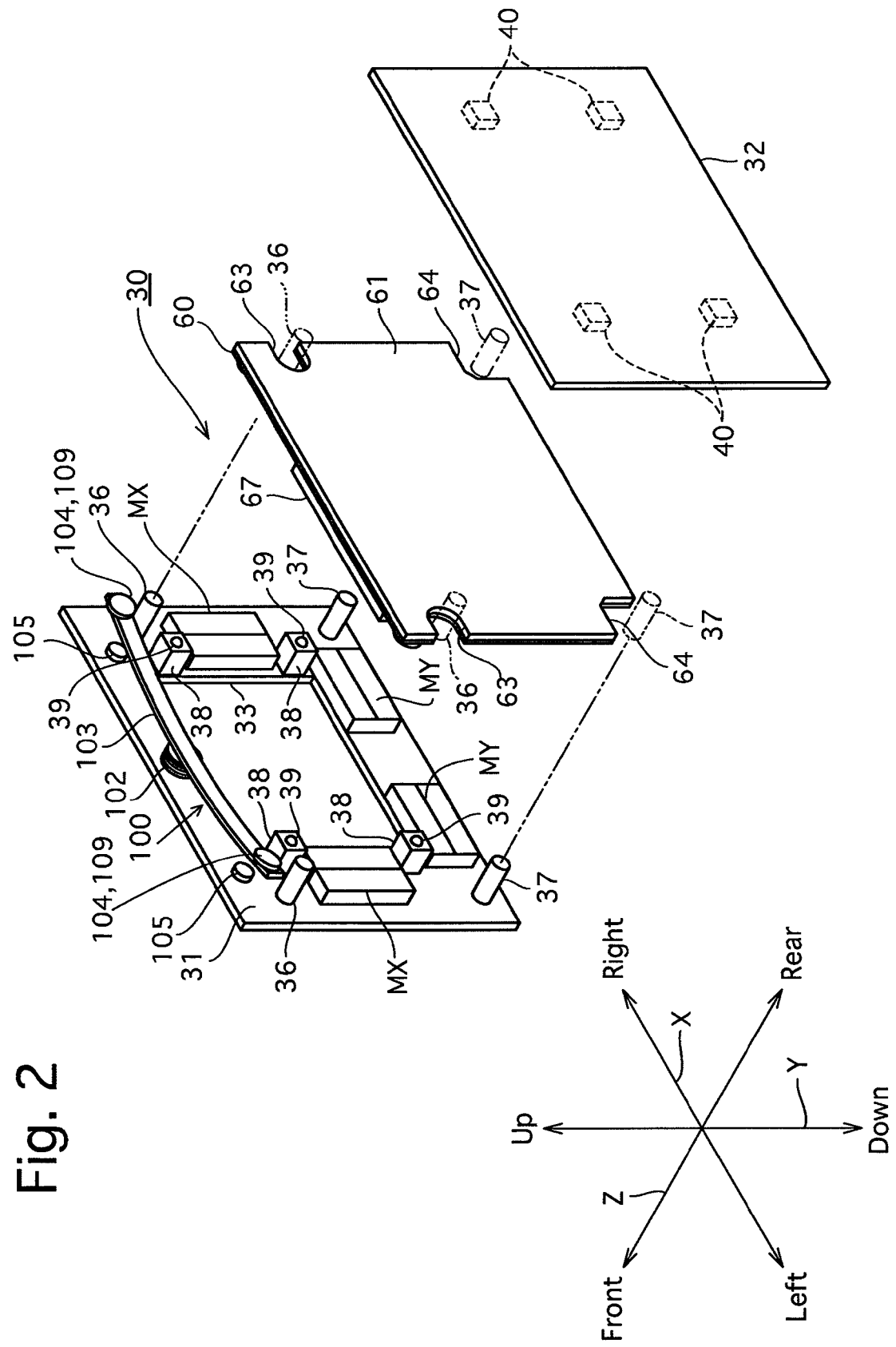
FIG. 2 is an exploded perspective view of the camera-shake correction apparatus shown in FIG. 1, viewed obliquely from the rear thereof.

As shown in FIG. 1, the digital camera 20 is provided therein with an optical system having first, second and third lens groups L1, L2 and L3, and the camera-shake correction apparatus 30 is provided behind the third lens group L3.

The camera-shake correction apparatus 30 has a construction shown in FIGS. 2 through 5. As shown in FIGS. 2 through 5, the camera-shake correction apparatus 30 is provided with a front stationary support board 31, which has a horizontal rectangular shape (as viewed from the front thereof) and is made from a magnetic material such as a soft iron, and a rear stationary support board (magnetic board) 32 having the same size and shape as the front stationary support board 31 in front view and is also made from a magnetic material such as a soft iron. The front stationary support board 31 and the rear stationary support board 32 are connected to each other by connecting four portions of the front stationary support board 31 with corresponding four portions of the rear stationary support board 32 by four support cylindrical columns 36 and 37, respectively, which extend in the Z-direction. The four support cylindrical columns 36 and 37 include two upper support cylindrical columns (moving range limiting pins) 36 and two lower support cylindrical columns 37. The front stationary support board 31 and the rear stationary support board 32 that are thus connected to each other are parallel to each other. The front stationary support board 31 is provided in a central portion thereof with a rectangular hole (through-hole) 33. The front stationary support board 31 is secured to an inner surface of a camera body of the digital camera 20 by three set screws (not shown).

The front stationary support board 31 is provided, on the rear surface thereof at four positions thereon, with four support projections 38, respectively, which project rearward. Each of the four support projections 38 is provided on a rear end surface thereof with a hemispherical recess (not shown) in which a front half portion of a metal ball 39 is rotatably fitted to be supported by the hemispherical recess. The rear stationary support board 32 is provided, on the front surface thereof at four positions facing the four support projections 38, with four support projections 40 which project forward to be aligned with the four support projections 38, respectively. Each of the four support projections 40 is provided on a front end surface thereof with a hemispherical recess (not shown) in which a rear half portion of a metal ball 41 is rotatably fitted to be supported by the hemispherical recess.

The camera-shake correction apparatus 30 is provided, on the rear surface of the front stationary support board 31 in the vicinity of the opposite ends thereof in the leftward/rightward direction, with two X-direction magnets MX which are secured to the rear surface of the front stationary support board 31 so that an S-pole and an N-pole of each X-direction magnet MX are aligned in the X-direction. The two X-direction magnets MX are aligned in the X-direction and the positions of the two X-direction magnets MX in the Y-direction are the same. Two X-direction magnetic circuits (magnetic drive circuits) are formed between the two X-direction magnets MX and two portions of the rear stationary support board 32 which face the two X-direction magnets MX in the forward/rearward direction, respectively, due to the magnetic flux of the two X-direction magnets MX passing through the front stationary support board 31 and the rear stationary support board 32. Namely, the front stationary support board 31 and the rear stationary support board 32 function as yokes.

On the other hand, the camera-shake correction apparatus 30 is provided, on the rear surface of the front stationary support board 31 at a lower end thereof aligned in the X-direction, with two Y-direction magnets (left and right Y-direction magnets) MY which are secured to the rear surface of the front stationary support board 31 so that an S-pole and an N-pole of each Y-direction magnet MY are aligned in the Y-direction (the positions of the two Y-direction magnets MY (the left and right Y-direction magnets as viewed in FIG. 3) in the Y-direction are the same). Two Y-direction magnetic circuits (magnetic drive circuits) are formed between the two Y-direction magnets MY and two portions of the rear stationary support board 32 which face the two Y-direction magnets MY in the forward/rearward direction, respectively, due to the magnetic flux of the two Y-direction magnets MY passing through the front stationary support board 31 and the rear stationary support board 32. Namely, the front stationary support board 31 and the rear stationary support board 32 function as yokes.

Figure 3:
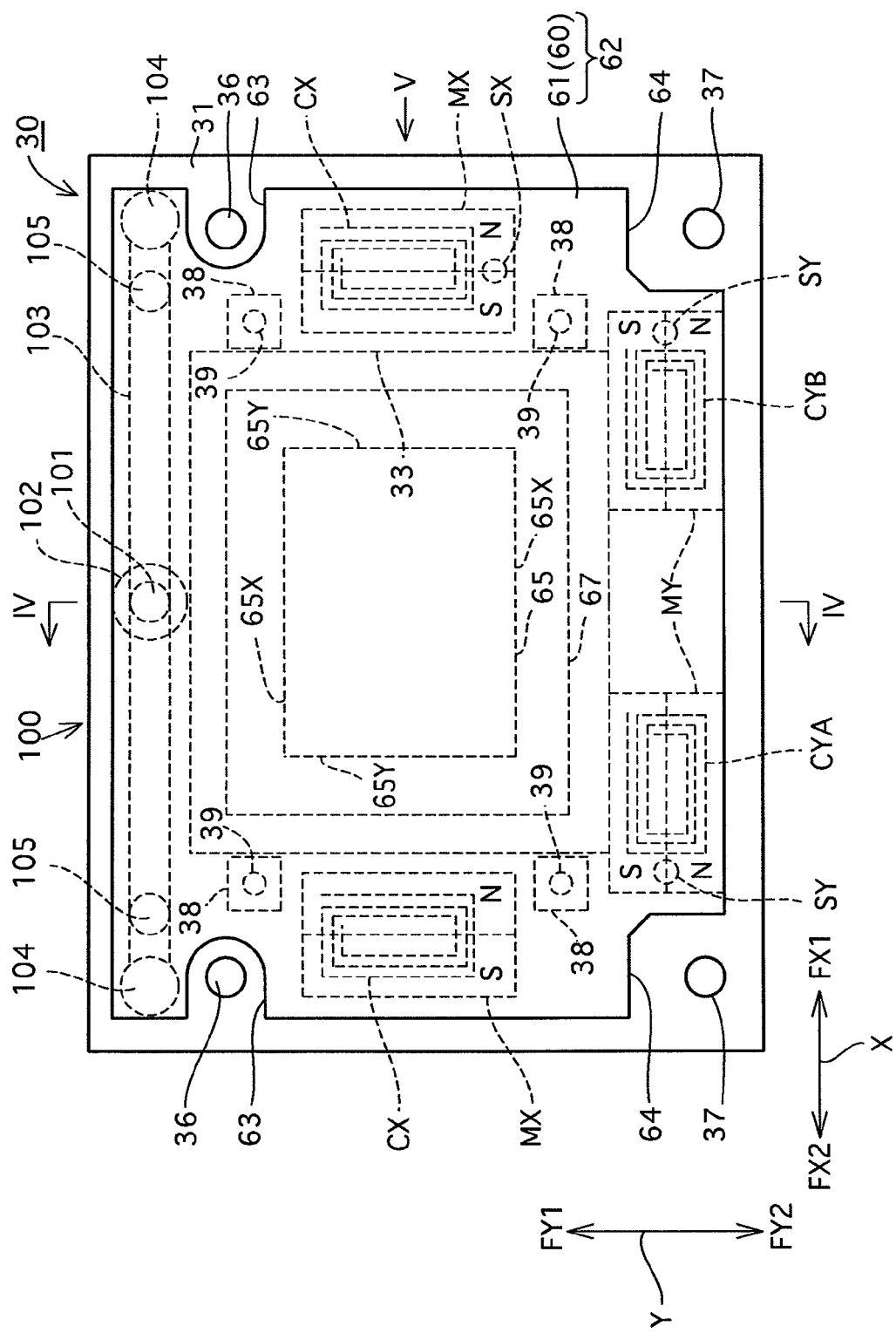
FIG. 3 is a rear elevational view of the camera-shake correction apparatus when an electrical board (CCD) thereof is in the initial position thereof a rear stationary support board of the camera-shake correction apparatus is not shown for the purpose of illustration.
Figure 5:
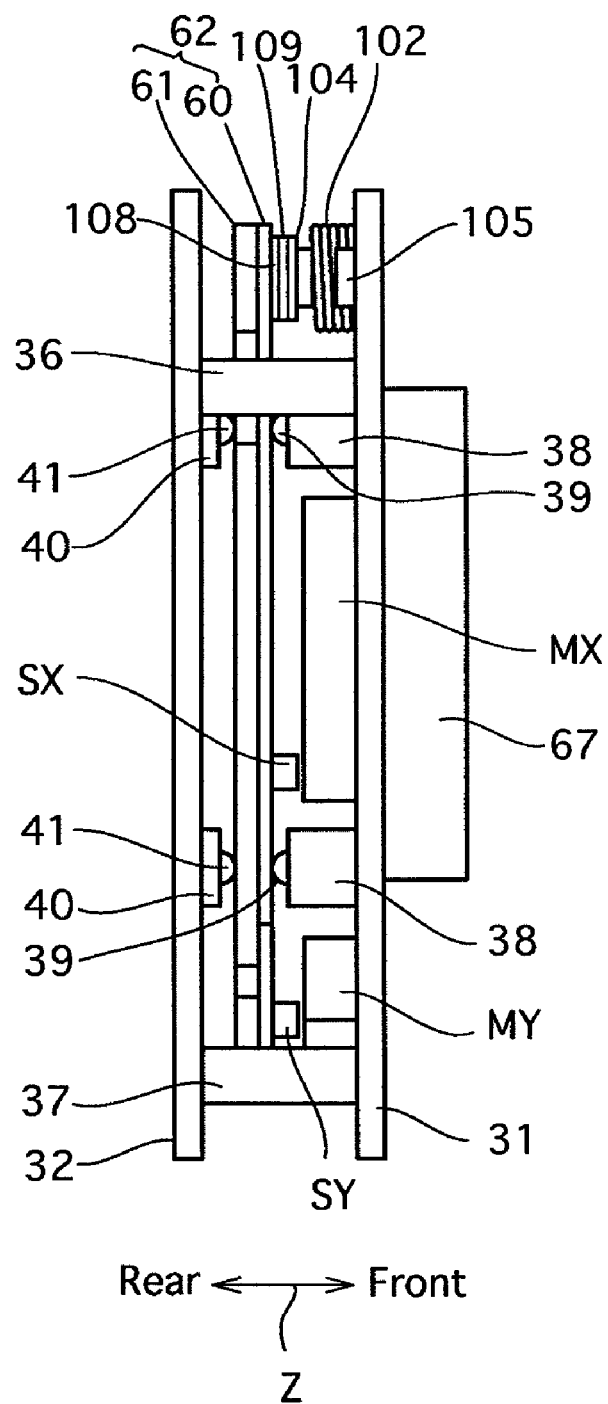
FIG. 5 is a side elevation as viewed in the direction V line shown in FIG. 3.

The camera-shake correction apparatus 30 is provided with an electrical board 60, which is a flat rectangular board, and a reinforcing plate 61 having the same shape and size as the electrical board 60 as viewed from the front. The reinforcing plate 61 is fixed to the back of the electrical board 60 to be integral therewith so that the electrical board 60 and the reinforcing plate 61 constitute a movable stage 62. As shown in FIGS. 3 and 5, the four metal balls 39 are in contact with the front surface of the electrical board 60 (i.e., the front surface of the movable stage 62) at four points to be freely rotatable thereat, respectively, and the four metal balls 41 are in contact with the rear surface of the reinforcing plate 61 (i.e., the rear surface on the movable stage 62) at four points to be freely rotatable thereat, respectively. In other words, the movable stage 62, which is constructed from the electrical board 60 and the reinforcing plate 61, is held between the four metal balls 39 and the four metal balls 41 in the forward/rearward position, and the movable stage 62 is provided orthogonal to the optical axis O of the photographic optical system having the first, second and third lens groups L1, L2 and L3 (i.e., the movable stage 62 is parallel to the front and rear stationary support boards 31 and 32).

Accordingly, from the initial position shown in FIG. 3 (where the center of an imaging surface 66 of the CCD 65 is positioned on the optical axis O), the movable stage 62 is linearly movable not only in the X-direction and the Y-direction relative to the front stationary support board 31 and the rear stationary support board 32 but also in an X-Y plane parallel to both the X-direction and the Y-direction (i.e., orthogonal to the optical axis O) relative to the front stationary support board 31 and the rear stationary support board 32. Two moving range limiting recesses 63 are formed in the movable stage 62 on the right and left edges thereof in the vicinity of the upper edge thereof. Among the four support cylindrical columns 36 and 37, the upper two support cylindrical columns 36 pass through the upper two moving range limiting recesses 63 in the direction of the optical axis O (optical axis direction/the Z-direction), respectively. The two support cylindrical columns 36 and the two moving range limiting recesses 63 constitute a moving range limiting device which limits the range of movement of the movable stage 62 relative to the front stationary support board 31 and the rear stationary support board 32 to a predetermined range of movement. Namely, the movable stage 62 is movable relative to the front stationary support board 31 and the rear stationary support board 32 within a range of movement in which the two support cylindrical columns 36 do not come in contact with the inner edges (inner walls) in the two moving range limiting recesses 63, respectively. Additionally, two cutout portions 64 are made at the lower left corner and the lower right corner of the movable stage 62 to prevent the movable stage 62 from interfering with the lower two support cylindrical columns 37, respectively.

Figure 4:
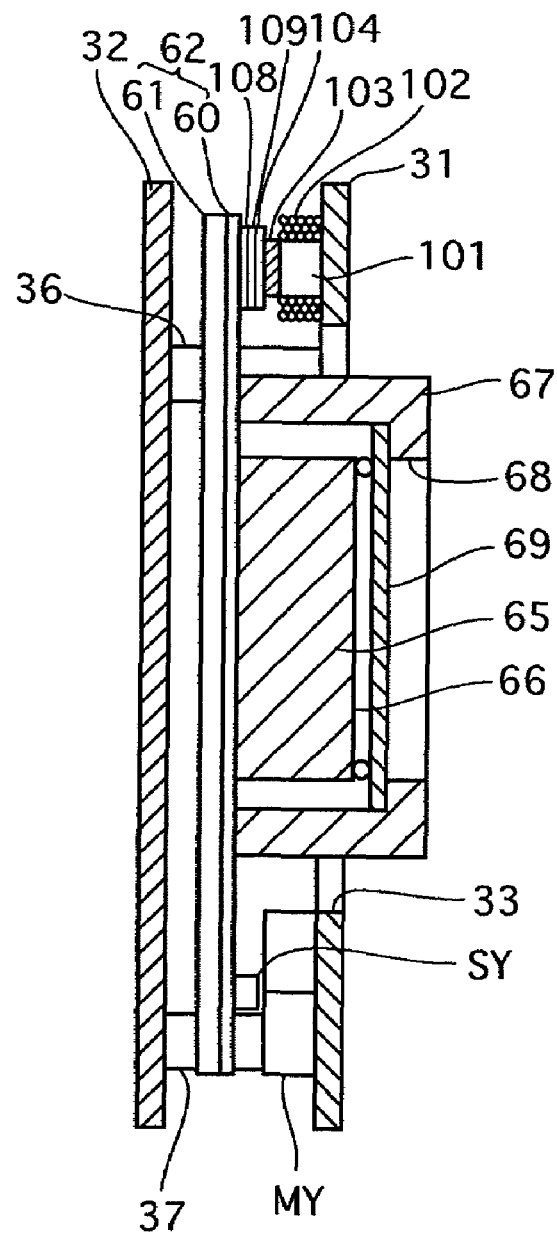
FIG. 4 is a cross sectional view taken along IV-IV line shown in FIG. 3.

A CCD (image pickup device) 65 is fixed to a front surface of the electrical board 60 at the center thereof. As shown in FIG. 3, the CCD 65 is in the shape of a rectangle as viewed from the front thereof. The CCD 65 is provided with a pair of X-direction edges (upper and lower X-direction edges) 65X which extend parallel to each other in the X-direction and a pair of Y-direction edges (right and left Y-direction edges) 65Y which extend parallel to each other in the Y-direction, in the state shown in FIG. 3 in which the electrical board 60 (the movable stage 62) is in the initial position thereof. A CCD holder 67 which surrounds the CCD 65 is fixed to the front of the electrical board 60 in an airtight fashion (dust-tight fashion). The CCD holder 67 projects forward from the front surface of the front stationary support board 31 through the rectangular hole 33 as shown in FIG. 4. As shown in FIG. 4, the CCD holder 67 is provided on a front wall thereof with an aperture (through-hole) 68 having a rectangular shape as viewed from the front of the camera-shake correction apparatus 30. An optical low-pass filter 69 is installed in the internal space of the CCD holder 67 to be fixedly fitted therein between the front wall of the CCD holder 67 and the CCD 65. The space between the optical low-pass filter 69 and the front wall of the CCD holder 67 is maintained in an air-tight state. The imaging surface 66 of the CCD 65 faces the optical low-pass filter 69 and the aperture 68 in the Z-direction at all times. The imaging surface 66 of the CCD 65 serves as an image-forming surface on which object light which is passed through the lenses L1, L2 and L3 and the optical low-pass filter 69 is formed as an object image.

As shown in FIG. 3, two planar X-direction drive coils CX having the same specifications are attached to the front of the electrical board 60 in the vicinity of the right and left edges thereof, respectively (on portions of the electrical board 60 which face the two X-direction magnets MX in the Z-direction, respectively). The two X-direction drive coils CX lie in a plane parallel to an X-Y plane, are each wound in a coiled shape by over one hundred turns (i.e., are wound in both a direction parallel to the electrical board 60 and a thickness direction of the electrical board 60), and are aligned in a direction parallel to the pair of X-direction edges 65X of the CCD 65 (in the X-direction in the state shown in FIG. 3). In other words, the positions of the two X-direction drive coils CX are coincident with each other in the direction parallel to the pair of Y-direction edges 65Y (in the Y-direction in the state shown in FIG. 3).

The two X-direction drive coils CX, the front stationary support board 31, the rear stationary support board 32 and the two X-direction magnets MX constitute an X-direction driving device.

An X-direction Hall element (position sensor) SX for detecting the position of the right X-direction drive coil CX (the position of the movable stage 62) in the X-direction with the use of the magnetic flux of the right X-direction magnet MX is fixed to a front surface of the electrical board 60 immediately below the right X-direction drive coil CX.

Two planar X-direction drive coils CYA and CYB having the same specifications are attached to the front of the electrical board 60 in the vicinity of the lower edge thereof (on portions of the electrical board 60 which face the two Y-direction magnets MY in the Z-direction, respectively). The two Y-direction drive coils CYA and CYB lie in a plane parallel to an X-Y plane, are each wound in a coiled shape by over one hundred turns (i.e., are wound in both a direction parallel to the electrical board 60 and a thickness direction of the electrical board 60), and are aligned in a direction parallel to the pair of X-direction edges 65X of the CCD 65 (in the X-direction in the state shown in FIG. 3). In other words, the positions of the two Y-direction drive coils CYA and CYB are coincident with each other in the direction parallel to the pair of Y-direction edges 65Y (in the Y-direction in the state shown in FIG. 3).

The two Y-direction drive coils CYA and CYB, the front stationary support board 31, the rear stationary support board 32 and the two Y-direction magnets MY constitute a Y-direction driving device.

A Y-direction Hall element (position sensor) SY for detecting the position of the left Y-direction drive coil CYA in the Y-direction with the use of the magnetic flux of the left Y-direction magnet MY is fixed to a front surface of the electrical board 60 immediately on the left-hand side of the left Y-direction drive coil CYA, and another Y-direction Hall element (position sensor) SY for detecting the position of the right Y-direction drive coil CYB in the Y-direction with the use of the magnetic flux of the right Y-direction magnet MY is fixed to a front surface of the electrical board 60 immediately on the right-hand side of the right Y-direction drive coil CYB.

The two X-direction drive coils CX, the two Y-direction drive coils CYA and CYB, the X-direction Hall element SX and the two Y-direction Hall elements SY are electrically connected to a controller constructed from a CPU, etc., provided inside the digital camera 20.

The camera-shake correction apparatus 30 carries out camera-shake (hand-shake) correction operations by supplying electric current through the two X-direction drive coils CX, and the two Y-direction drive coils CYA and CYB from the controller.

In other words, if electric current is supplied to the X-direction drive coils CX, a linear drive force acting in either direction FX1 or direction FX2 shown in FIG. 3 occurs in the X-direction drive coils CX. Similarly, if electric current is supplied to the Y-direction drive coils CYA and CYB, a linear drive force acting in the either direction FY1 or direction FY2 shown in FIG. 3 occurs in the Y-direction drive coils CYA and CYB.

As is commonly known in the art, when the camera body of the digital camera 20 rotates about an Y-axis or an X-axis due to hand-shake (camera shake), the amount of movement of the imaging surface 66 (amount of hand-shake) in the X-direction and the Y-direction is detected, and if the CCD 65 is linearly moved with respect to the camera body by the same amount as the detected amount of hand-shake but in the opposite direction with the use of the results of detection of the X-direction Hall element SX and the two Y-direction Hall elements SY, the hand-shake (camera shake/image shake) of the CCD 65 is corrected. Accordingly, in order for the CCD 65 to be linearly moved in such a manner, if electric current is supplied from the controller to the two X-direction drive coils CX and the two Y-direction drive coils CYA and CYB, camera shake applied to the CCD 65 in the X-direction and Y-direction is corrected.

Furthermore, since the movable stage 62 (CCD 65) is rotatable relative to the front stationary support board 31 and the rear stationary support board 32, if the directions of the electric currents supplied to the Y-direction drive coil CYA and the Y-direction drive coil CYB, respectively, are made mutually opposite so that mutually opposite driving forces occur between the Y-direction drive coil CYA and the Y-direction drive coil CYB, the movable stage 62 (CCD 65) is rotated. Accordingly, when rotational shake (rotational camera shake) occurs in the camera body of the digital camera 20, this rotational shake can be corrected if electric current is supplied from the controller to the Y-direction drive coil CYA and the Y-direction drive coil CYB so that the movable stage 62 (CCD 65) is rotated in a rotational direction opposite to the rotational direction of the rotational shake. Note that such rotational shake can be controlled by differentiating the magnitudes of electric currents supplied to the Y-direction drive coil CYA and the Y-direction drive coil CYB to thereby make the Y-direction drive coil CYA and the Y-direction drive coil CYB produce driving forces which are mutually identical in direction of force but different in magnitude of electric current, instead of making the Y-direction drive coil CYA and the Y-direction drive coil CYB produce mutually opposite driving forces.

The lock mechanism 100 according to the present invention which is installed in the camera-shake correction apparatus 30 will be described hereinafter.

Figure 6:
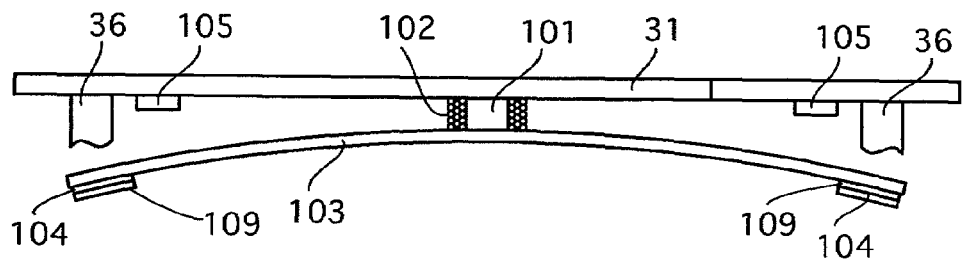
FIG. 6 is a plan view of a leaf spring in a free state thereof and elements positioned in the vicinity of the leaf spring in the camera-shake correction apparatus.

The lock mechanism 100 includes elements which will be described hereinafter. As shown in the drawings such as FIGS. 3 and 4, a core rod (conductive connecting member) 101 having a cylindrical column shape which extends in the Z-direction is fixed at the front end face thereof to the rear surface of the front stationary support board 31 in the vicinity of the upper edge thereof. The core rod 101 is made of a magnetic material such as metal. A coil 102 made of a conductive material such as metal is wound around the core rod 101 in a coiled shape and electrically connected to the aforementioned controller. A leaf spring (press portion) 103 which is elongated in substantially the horizontal direction (the X-direction) is fixed at a central portion of the front surface thereof to the rear end face of the core rod 101. Similar to the coil 102, the leaf spring 103 is made of a conductive material such as metal. As shown in FIG. 6, the leaf spring 103 has a curved shape in a free state which is shaped so that the horizontally opposite ends of the leaf spring 103 are positioned behind the horizontal center of the leaf spring 103 in the Z-direction. Two disk-shaped (cylindrical-shaped) press members (press portion) 104 are fixed to the rear surface of the leaf spring 103 at the horizontally opposite ends thereof, respectively. A frictional contacting member 109 formed in a thin layer of frictional contacting sheet and made of rubber, polyvinyl chloride (PVC) or the like is fixed to the rear surface of each press member 104. Two cylindrical-column-shaped lock release magnets 105 made as permanent magnets are fixed to the rear surface of the front stationary support board 31 at two positions thereon so as to face horizontally opposite end portions (left and right end portions) of the leaf spring 103, respectively.

In addition, two disk-shaped (cylindrical-shaped) pressed members 108 are fixed to the front surface of the electrical board 60 at two positions corresponding to the positions of the two press members 104 in the Z-direction, respectively. The right and left pressed members 108 remain opposed to the right and left press members 104 in the Z-direction, respectively, regardless of where the movable stage 62 moves (within the range of movement of the movable stage 62 which is defined by the two support cylindrical columns 36 and the two moving range limiting recesses 63).

The operation of the above-described lock mechanism 100 will be discussed hereinafter.

Figure 7:
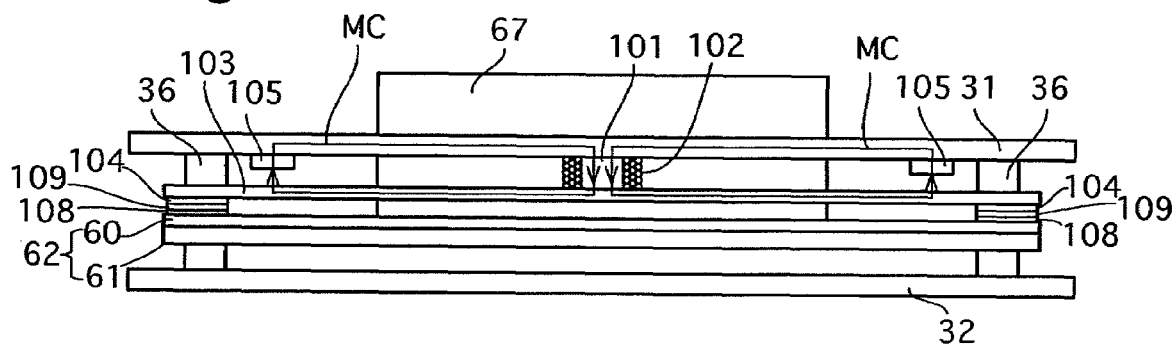
FIG. 7 is a plan view of the camera-shake correction apparatus when a lock mechanism therefor is in an locked state.

When a main switch (not shown) of the digital camera 20 is OFF, or when this main switch is ON and a camera-shake correction switch SW (shown in FIG. 1) of the digital camera 20 is OFF, the movable stage 62 is at the initial position (non-operational state) as shown in FIG. 3, and no electric current is supplied to the coil 102 from the aforementioned controller. Although two magnetic circuits MC (see FIGS. 7 and 8) are formed between the front stationary support board 31 and the leaf spring 103 via the core rod 101 and the two lock release magnets 105 by magnetic forces generated by the two lock release magnets 105, the leaf spring 103 maintains its free state shown in FIG. 6 against the magnetic force (magnetic attracting force) between the leaf spring 103 (the two portions thereof which face the two lock release magnets 105, respectively) and the two lock release magnets 105 since this magnetic force is weaker than the biasing force of the leaf spring 103. Accordingly, the two frictional contacting members 109 (fixed to the rear surfaces of the two press members 104, respectively) which are biased to move rearward by the leaf spring 103 come into intimate surface contact with the front surfaces of the two pressed members 108, respectively (see FIG. 7). Upon the right and left frictional contacting members 109 coming in surface contact with the front surfaces of the right and left pressed members 108, respectively, friction which prevents the movable stage 62 from moving relative to the front stationary support board 31 and the rear stationary support board 32 occurs between each frictional contacting member 109 and the front surface of the associated pressed member 108 (so that the movable stage 62 is locked). Therefore, in this locked state, the movable stage 62 (CCD 65) does not move in either the X-direction or the Y-direction even if the camera body is shaken. Moreover, the movable stage 62 (CCD 65) does not rotate relative to the camera body either because the movable stage 62 is locked by the two press member 104 and the two pressed members 108 with the aid of the two frictional contacting members 109.

Figure 8:
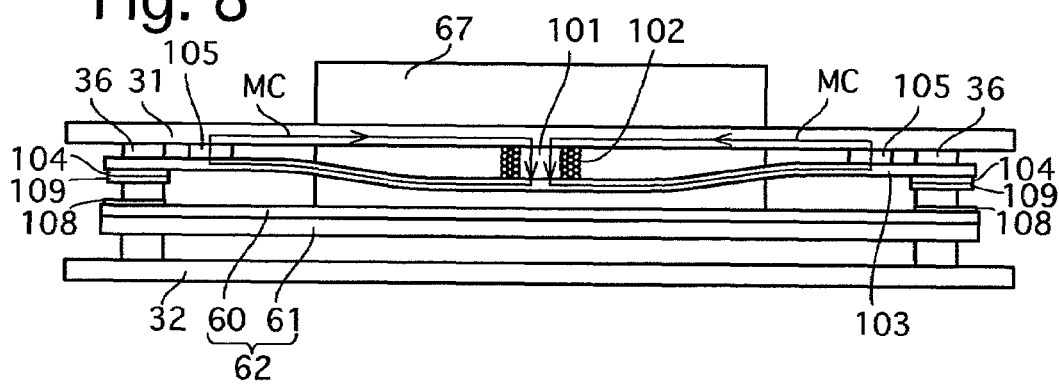
FIG. 8 is a plan view of the camera-shake correction apparatus when the lock mechanism is in an unlocked state.

Upon the camera-shake correction switch SW being turned ON when the main switch is ON, an electric current is passed through the coil 102 in a specific direction from the aforementioned controller, so that the coil 102 and the core rod 101 become an electromagnet. Once the coil 102 and the core rod 101 become an electromagnet, the magnetic force (magnetic attracting force) between the leaf spring 103 (the two portions thereof which face the two lock release magnets 105, respectively) and the two lock release magnets 105 becomes stronger than the biasing force of the leaf spring 103 because the magnetic force generated by the electronic magnet (101 and 102) exerts an influence upon the magnetic circuits MC (so as to enhance the magnetic force generated thereby). Consequently, portions of the leaf spring 103 in the vicinity of the horizontally opposed ends of the leaf spring 103 are curved to move forward (upward as viewed in FIGS. 6 and 7) against the resiliency thereof so that two portions of the leaf spring 103 in the vicinity of the horizontally opposed ends of the leaf spring 103 magnetically stick to the two lock-release magnets 105, respectively, as shown in FIG. 8. Upon the leaf spring 103 sticking to the two lock release magnets 105, the lock mechanism 100 falls into an unlocked state in which the two press members 104 and the two pressed members 108 are disengaged from each other, respectively. As a result, the movable stage 62 (CCD 65) becomes movable relative to the camera body, and accordingly, the aforementioned camera-shake correction operation becomes possible.

Upon the leaf spring 103 sticking to the right and left lock release magnets 105 by the magnetic force thereof, the passage of electric current through the coil 102 from the aforementioned controller is shut off. However, once the leaf spring 103 sticks to the two lock release magnets 105, the leaf spring 103 maintains the unlocked state shown in FIG. 8 against it own resiliency, and accordingly, the aforementioned unlocked state is maintained. To make sure this unlocked state is maintained, it is possible to reduce the electric current supplied to the coil 102 from the aforementioned controller without shutting off the passage of electric current through the coil 102 after the leaf spring 103 sticks to the right and left lock release magnets 105.

In this state, upon either the camera-shake correction switch SW or the main switch of the digital camera 20 being turned OFF, an electric current is instantaneously (temporarily) passed through the coil 102 in the direction opposite to the aforementioned specific direction from the aforementioned controller. Thereupon, the magnetic force generated by the electromagnet (101 and 102) exerts an influence on the magnetic circuits MC (so as to weaken the magnetic force generated thereby), so that the magnetic force (magnetic attracting force) between the leaf spring 103 (the two portions thereof which face the two lock release magnets 105, respectively) and the two lock release magnets 105 becomes weaker than the biasing force of the leaf spring 103. Consequently, the leaf spring 103 resiliently returns to the free state thereof shown in FIG. 6. As a result, the two frictional contacting members 109 come in surface contact with the front surfaces of the two pressed members 108 again, respectively, to thereby lock the movable stage 62 again.

As described above, in the present embodiment of the camera-shake correction apparatus, the movable stage 62 can be securely locked and easily unlocked by the lock mechanism 100, which includes the core rod 101, the coil 102, the leaf spring 103, the two press members 104, the two lock release magnets 105, the two pressed members 108 and the two frictional contacting members 109 as elements of the lock mechanism 100.

Moreover, a firmly locked state of the movable stage 62 can be achieved because the movable stage 62 is prevented from moving even a little bit upon the two frictional contacting members 109 and the two pressed members 108 coming into surface contact with each other, respectively, by the resiliency of the leaf spring 103.

Moreover, the right and left frictional contacting members 109 and the right and left pressed members 108 can be brought into contact with each other, respectively, with no need to move the movable stage 62 to the initial position thereof (with no need to perform a centering operation for centering the movable stage 62) when the movable stage 62 is locked because the right and left pressed members 108 remain opposed to the right and left frictional contacting members 109 (the right and left press members 104) in the Z-direction, respectively, regardless of where the movable stage 62 moves (within the range of movement of the movable stage 62 which is defined by the two support cylindrical columns 36 and the two moving range limiting recesses 63).

Furthermore, the existence of the leaf spring 103 does not cause a substantial increase in size (thickness) of the lock mechanism 100 or the camera-shake correction apparatus 30 in the optical axis direction (the Z-direction) because the leaf spring 103, which is positioned between the front stationary support board 31 and the electrical board 60 and serves as an element for biasing the right and left frictional contacting members 109 (the right and left press members 104) toward the right and left pressed members 108, respectively, is a plate member elongated in a direction substantially parallel to the front stationary support board 31 (and also parallel to each of the rear stationary support board 32, the electrical board 60 and the reinforcing plate 61). Therefore, the lock mechanism 100 (the camera-shake correction apparatus 30) can be made smaller in size in the optical axis direction than a conventional lock mechanism (conventional camera-shake correction apparatus).

Furthermore, since the lock mechanism 100 has a small number of components and has a simple construction, the manufacturing cost thereof can be reduced.

Although the present invention has been discussed with reference to the specific embodiment described above, the present invention is not limited solely thereto; various changes can be made in the specific embodiment without departing from the scope of the invention claimed.

For instance, although the front stationary support board 31, the rear stationary support board 32, the two X-direction magnets MX, the two Y-direction magnets MY, the two planar X-direction drive coils CX and the two planar X-direction drive coils CYA and CYB are used as a driving device for driving the movable stage 62 in the above described embodiment of the camera-shake correction apparatus, a different driving device using, e.g., motors can be used instead.

In addition, the two frictional contacting members 109 can be fixed in various manners.

Figure 9:
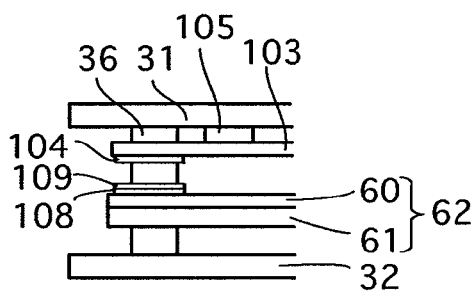
FIG. 9 is a plan view of a portion of a modified embodiment of the camera-shake correction apparatus when the lock mechanism is in an unlocked state, showing a different manner of fixing the frictional contacting members.

For instance, the two frictional contacting members 109 can be fixed to the front surfaces of the two pressed members 108, respectively, as shown in FIG. 9, rather than the two press members 104.

Figure 10:
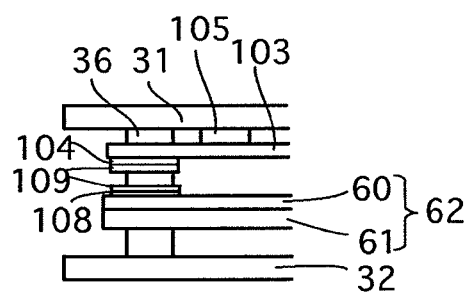
FIG. 10 is a view similar to that of FIG. 9 and illustrates another modified embodiment of the camera-shake correction apparatus when the lock mechanism is in an unlocked state, showing a different manner of fixing the frictional contacting members.

As shown in FIG. 10, it is possible to fix two frictional contacting members 109 and another two frictional contacting members 109 to the rear surfaces of the two press members 104 on the leaf spring 103 side and the front surfaces of the two pressed members 108 on the electrical board 60 side, respectively. In this case, the movable stage 62 can be locked by making the front two frictional contacting members 109 and the rear two frictional contacting members 109, which face each other in the optical axis direction (the Z-direction), come into contact with each other, respectively.

Figure 11:
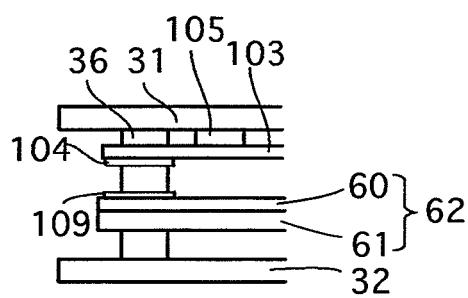
FIG. 11 is a view similar to that of FIG. 9 and illustrates another modified embodiment of the camera-shake correction apparatus when the lock mechanism is in an unlocked state, showing a different manner of fixing the frictional contacting members.

It is possible to omit the two pressed members 108 by an arrangement as shown in FIG. 11 in which the two frictional contacting members 109 are directly fixed to the front surface of the electrical board 60 so that the rear surfaces of the two press members 104 can come into contact with the two frictional contacting members 109, respectively.

Figure 12:
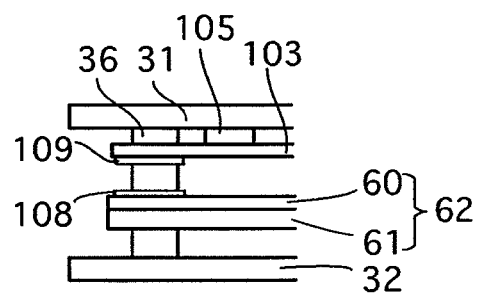
FIG. 12 is a view similar to that of FIG. 9 and illustrates another modified embodiment of the camera-shake correction apparatus when the lock mechanism is in an unlocked state, showing a different manner of fixing the frictional contacting members.

As shown in FIG. 12, it is possible to fix the two frictional contacting members 109 directly to the rear surface of the leaf spring 103 (with the two press members 104 being omitted) to allow the two frictional contacting members 109 to come into contact with the front surfaces of the two pressed members 108, respectively.

Figure 13:
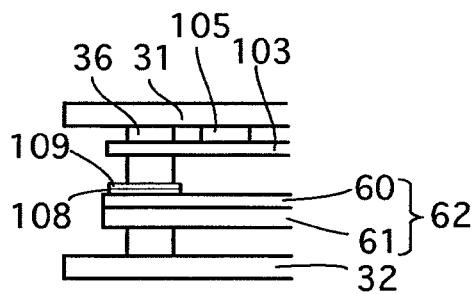
FIG. 13 is a view similar to that of FIG. 9 and illustrates another modified embodiment of the camera-shake correction apparatus when the lock mechanism is in an unlocked state, showing a different manner of fixing the frictional contacting members.

As shown in FIG. 13, it is possible to make the two frictional contacting members 109 which are respectively fixed to the front surfaces of the two pressed members 108 come in direct contact with the rear surface of the leaf spring 103 (with the two press members 104 being omitted; in the case, the leaf spring 103 serves as a press member).

Figure 14:
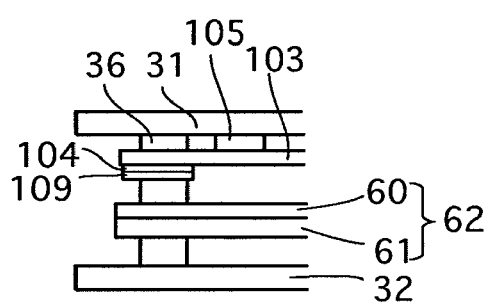
FIG. 14 is a view similar to that of FIG. 9 and illustrates another modified embodiment of the camera-shake correction apparatus when the lock mechanism is in an unlocked state, showing a different manner of fixing the frictional contacting members.

As shown in FIG. 14, it is possible to bring the two frictional contacting members 109 which are respectively fixed to the rear surfaces of the two press members 104 into direct contact with the front surface of the electrical board 60 (with the two pressed members 108 being omitted; in the case, the electrical board 60 serves as a pressed member).

Figure 15:
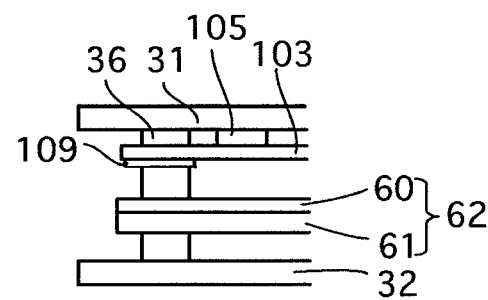
FIG. 15 is a view similar to that of FIG. 9 and illustrates another modified embodiment of the camera-shake correction apparatus when the lock mechanism is in an unlocked state, showing a different manner of fixing the frictional contacting members.
Figure 16:
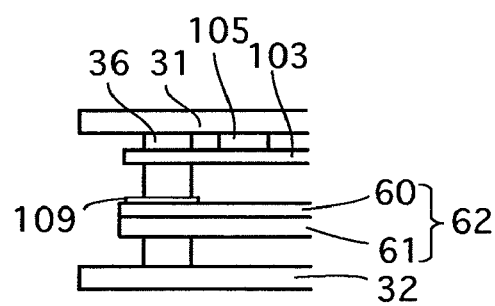
FIG. 16 is a view similar to that of FIG. 9 and illustrates another modified embodiment of the camera-shake correction apparatus when the lock mechanism is in an unlocked state, showing a different manner of fixing the frictional contacting members.

As shown in FIGS. 15 and 16, it is possible to make the two frictional contacting members 109 which are fixed to one of the leaf spring 103 and the electrical board 60 come in direct contact with the other of the leaf spring 103 and the electrical board 60 with both the two press members 104 and the two pressed members 108 being omitted.

Figure 17:
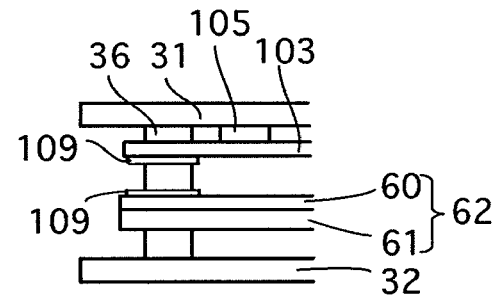
FIG. 17 is a view similar to that of FIG. 9 and illustrates another modified embodiment of the camera-shake correction apparatus when the lock mechanism is in an unlocked state, showing a different manner of fixing the frictional contacting members.

As shown in FIG. 17, it is possible to fix two frictional contacting members 109 and another two frictional contacting members 109 directly to the rear surface of the leaf spring 103 and the front surface of the electrical board 60, respectively (with both the two press members 104 and the two pressed members 108 being omitted) so that the movable stage 62 can be locked by making the front two frictional contacting members 109 and the rear two frictional contacting members 109, which face each other in the optical axis direction (the Z-direction), come into contact with each other, respectively.

Although the number of the frictional contacting members 109 is two in each of the above illustrated embodiment and modified embodiments of the lock mechanisms, it is possible that the lock mechanism be provided, on one or both of the leaf spring 103 side (on the press members 104 or directly on the leaf spring 103) and the electrical board 60 side (on the pressed members 108 or directly on the electrical board 60), with more than two frictional contacting members 109.

If a frictional force which prevents the movable stage 62 from moving relative to the front stationary support board 31 and the rear stationary support board 32 only needs to be produced between the press member(s) and the pressed member(s) that face each other, the frictional contacting members 109 can be made of any material other than rubber and polyvinyl chloride (PVC).

Additionally, although an electric current is passed through the coil 102 to unlock the lock mechanism 100 upon the camera-shake correction switch SW being turned ON in the above described embodiment of the lock mechanism, it is possible to unlock the lock mechanism by passing an electric current through the coil 102 in synchronization with a depression of a shutter release button B (shown in FIG. 1) provided on the camera body of the digital camera 20.

It is possible to make two moving range limiting holes (not shown) in the movable stage 62 instead of making the two moving range limiting recesses 63 therein so that the two support cylindrical columns 36 are engaged in the two moving range limiting holes to be relatively movable therein, respectively. Alternatively, it is possible to make two recesses or holes corresponding to the two moving range limiting recesses 63 in the front stationary support board 31 or the rear stationary support board 32 and to provide the electrical board 60 or the reinforcing plate 61 with two pins corresponding to the two support cylindrical columns so that the two pins are engaged in the two recesses or holes to be relatively movable therein, respectively.

The two X-direction magnets MX and the two Y-direction magnets MY can be fixed to the rear stationary support board 32, rather than the front stationary support board 31.

An image pickup device other than the CCD 65 can be used, e.g., a CMOS imaging sensor can of course be alternatively used.

Furthermore, although the lock mechanism according to the present invention is applied to the camera-shake correction apparatus 30 in which the movable stage 62 is rotatable in the above illustrated embodiment of the digital camera, the above described lock mechanism can be applied to a convention camera-shake (hand-shake) correction apparatus which only linearly moves a movable stage in the X-direction and the Y-direction, and can also be applied to a stage apparatus (an apparatus in which a specific member is linearly movable in the X-direction and/or Y-direction, or rotatable) having a different usage from that of a camera-shake correction apparatus.

In the case where the movable stage 62 (the electrical board 60 and the reinforcing member 61) is movable only linearly in the X-direction and the Y-direction (i.e., irrotatable), only one frictional contacting member 109 needs to be provided on one of the leaf spring 103 side and the electrical board 60 side; it is not necessary to provide more than one frictional contacting member 109 (at more than one position).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lock mechanism for a stage apparatus, comprising:
   a stationary support board;
   a movable stage movable relative to said stationary support board in a plane parallel to said stationary support board;
   a leaf spring made of a magnetic material which is partly supported by said stationary support board to be substantially parallel to said stationary support board;
   a press portion and a pressed portion provided on said leaf spring and said movable stage, respectively, said press portion being pressed against said pressed portion to lock said movable stage, a frictional contacting member being fixed to at least one of opposed surfaces of said press portion and said pressed portion to enhance friction between said press portion and said pressed portion;
   an electromagnet for resiliently deforming said leaf spring in a lock releasing direction to disengage said frictional contacting member from said one of opposed surfaces of said press portion and said pressed portion by exerting magnetic force on said leaf spring upon an electric current being passed through said electromagnet in a specific direction; and
   a permanent magnet, fixed to said stationary support board, which magnetically attracts said leaf spring to hold said frictional contacting member and said one of opposed surfaces of said press portion and said pressed portion in a disengaged state when said leaf spring is resiliently deformed in said lock releasing direction by said electromagnet.

2. The lock mechanism for the stage apparatus according to claim 1, wherein said electromagnet generates a magnetic force which counteracts the effect of a magnetic attracting force between said leaf spring and said electromagnet to disengage said leaf spring from said permanent magnet when an electric current is passed through said electromagnet in a direction opposite to said specific direction in a state where said leaf spring is magnetically attracted by said permanent magnet to stick thereto.

3. The lock mechanism for the stage apparatus according to claim 1, wherein said frictional contacting member comprises at least two frictional contacting members arranged at different positions as viewed in a direction orthogonal to said movable stage.

4. The lock mechanism for the stage apparatus according to claim 1, further comprising a moving range limiting device, provided between said movable stage and said stationary support board, which limits the range of movement of said movable stage relative to said stationary support board to a predetermined range of movement in which said press portion and said pressed portion remain opposed to each other regardless of where said movable stage moves within said predetermined range of movement.

5. The lock mechanism for the stage apparatus according to claim 4, wherein said moving range limiting device comprises:
- a moving range limiting pin which projects from one of said movable stage and said stationary support board; and
- one of a moving range limiting hole and a moving range limiting recess which is formed in the other of said movable stage and said stationary support board and in which said moving range limiting pin is inserted.

6. The lock mechanism for the stage apparatus according to claim 1, wherein said movable stage is rotatable relative to said stationary support board.

7. The lock mechanism for the stage apparatus according to claim 1, wherein said frictional contacting member is made of one of rubber and polyvinyl chloride.

8. The lock mechanism for the stage apparatus according to claim 1, wherein said stationary support board is made of a magnetic material, wherein said electromagnet comprises:
- a core rod made of a magnetic material which connects said leaf spring to said stationary support board; and
- a coil which is positioned around said core rod and through which an electric current is passed, and
- wherein a magnetic circuit is formed between said stationary support board and said leaf spring via said core rod and said permanent magnet to generate a magnetic attracting force between said leaf spring and said permanent magnet.

9. The lock mechanism for the stage apparatus according to claim 8, further comprising:
- a magnetic board positioned on the opposite side of said movable stage with respect to said stationary support board so that said movable stage is positioned between said magnetic board and said stationary support board;
- a magnet, fixed to one of said stationary support board and said magnetic board, for forming a magnetic drive circuit between said stationary support board and said magnetic board in order to drive said movable stage; and
- a drive coil, fixed to said movable stage, for producing a driving force which moves said movable stage relative to said stationary support board by receiving magnetic force generated by said magnetic drive circuit in a state where an electric current is passed through said drive coil.

10. The lock mechanism for the stage apparatus according to claim 1, wherein said stationary support board comprises two stationary support boards arranged parallel to said movable stage with said movable stage positioned between said two stationary support boards.

11. The lock mechanism for the stage apparatus according to claim 10, wherein said leaf spring and said permanent magnet are fixed to one of said two stationary support boards.

12. The lock mechanism for the stage apparatus according to claim 11, wherein said permanent magnet comprises two permanent magnets positioned on opposite sides of said electromagnet to face said leaf spring in a vicinity of opposite ends of said leaf spring, respectively, in a direction orthogonal to said movable stage.

13. The lock mechanism for the stage apparatus according to claim 1, wherein said lock mechanism is configured for a camera-shake correction apparatus incorporated in a digital camera.

14. The lock mechanism for the stage apparatus according to claim 13, wherein said movable stage is provided with an image pickup device mounted thereon.

15. A lock mechanism for a stage apparatus, comprising:
- two stationary support boards;
- a movable stage positioned between said two stationary support boards to be movable relative to said two stationary support boards in a plane parallel to said two stationary support boards;
- a conductive leaf spring which is positioned between one of said two stationary support boards and said movable stage and fixed at a central portion of said conductive leaf spring to said one of said two stationary support boards via a conductive connecting member;
- two press portions fixed to said leaf spring on opposite sides of said conductive connecting member, respectively, and two pressed portions fixed to said movable stage to face said two press portions, respectively, said two press portions being pressed against said two pressed portions when said movable stage is locked, and a frictional contacting member being fixed to at least one of opposed surfaces of each said two press portion and associated one of said two pressed portions;
- a coil positioned around said conductive connecting member, said conductive connecting member and said coil serving as an electromagnet which resiliently deforms said leaf spring in a lock releasing direction to disengage said frictional contacting member from said one of opposed surfaces by exerting magnetic force on said leaf spring upon an electric current being passed through said coil in a specific direction; and
- at least one permanent magnet, fixed to said stationary support board, which magnetically attracts said leaf spring to hold said frictional contacting member and said one of opposed surfaces in a disengaged state when said leaf spring is resiliently deformed in said lock releasing direction by said electromagnet.

* * * * *